(12) United States Patent
Kim et al.

(10) Patent No.: US 12,387,085 B2
(45) Date of Patent: Aug. 12, 2025

(54) DEEP LEARNING DEVICE AND SYSTEM INCLUDING THE SAME

(71) Applicant: Samsung Electronics Co., Ltd., Suwon-si (KR)

(72) Inventors: Young Jae Kim, Suwon-si (KR); Kae Weon You, Hwaseong-si (KR); Ji Ung Lee, Seoul (KR); Jun Haeng Lee, Hwaseong-si (KR); Kyoung Hoon Kang, Hwaseong-si (KR); Young Hak Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 848 days.

(21) Appl. No.: 17/529,439

(22) Filed: Nov. 18, 2021

(65) Prior Publication Data

US 2022/0374680 A1   Nov. 24, 2022

(30) Foreign Application Priority Data

May 21, 2021  (KR) .................. 10-2021-0065586
Jul. 15, 2021  (KR) .................. 10-2021-0092932

(51) Int. Cl.
*G06N 3/042*   (2023.01)
(52) U.S. Cl.
CPC .................................. *G06N 3/042* (2023.01)
(58) Field of Classification Search
None
See application file for complete search history.

(56) References Cited

U.S. PATENT DOCUMENTS

| 9,336,484 B1 | 5/2016 | Iverson |
| 10,529,317 B2 | 1/2020 | Lee et al. |

(Continued)

FOREIGN PATENT DOCUMENTS

| JP | 6767434 B2 | 10/2020 |
| KR | 10-2019-0110073 A | 9/2019 |

OTHER PUBLICATIONS

Ozan Sener, et al., "Active Learning for Convolutional Neural Networks: A Core-Set Approach," published as a conference paper at ICLR 2018, Submitted on Aug. 1, 2017.

(Continued)

*Primary Examiner* — Dov Popovici
(74) *Attorney, Agent, or Firm* — Wolf, Greenfield & Sacks, P.C.

(57) ABSTRACT

A deep learning device and system including the same is provided. The deep learning device comprising processing circuitry configured to determine whether a received image is abnormal using an anomaly detection model; merge at least some vectors extracted from the anomaly detection model; input, to a probability approximation model, principal components generated by a principal component analysis (PCA) to detect whether out of distribution (OOD) occurs in data of the received image; store a result of the determinations; and extract at least some the data in which the OOD occurs, as target labeling, using a target labeling extraction model when a rate of the data in which the OOD occurs is greater than or equal to a threshold value, wherein the anomaly detection model determines whether the received image is abnormal using the target labeling.

20 Claims, 14 Drawing Sheets

(56) References Cited

U.S. PATENT DOCUMENTS

| | | | |
|---|---|---|---|
| 2013/0346350 A1 | 12/2013 | Subramanian et al. | |
| 2018/0365595 A1 | 12/2018 | Zhou | |
| 2021/0092369 A1* | 3/2021 | Jung | H04N 19/117 |
| 2022/0230414 A1* | 7/2022 | Noh | G06N 3/08 |
| 2022/0392051 A1* | 12/2022 | Hur | G06F 18/2433 |
| 2023/0377314 A1* | 11/2023 | Pezzotti | G06V 10/82 |
| 2024/0185582 A1* | 6/2024 | Bozorgtabar | G06V 10/762 |

OTHER PUBLICATIONS

Shiyu Liang, et al., "Enhancing The Reliability of Out-of-distribution Image Detection in Neural Networks," published as a conference paper at ICLR 2018, Submitted on Jun. 8, 2017.

\* cited by examiner

FIG. 7

| Layer | Output | Layer | Output |
|---|---|---|---|
| Activation_1 | (256, 256, 64) | Activation_28 | (32, 32, 1024) |
| Activation_4 | (128, 128, 256) | Activation_31 | (32, 32, 1024) |
| Activation_7 | (128, 128, 256) | Activation_34 | (32, 32, 1024) |
| Activation_10 | (128, 128, 256) | Activation_37 | (32, 32, 1024) |
| Activation_13 | (128, 128, 256) | Activation_40 | (32, 32, 1024) |
| Activation_16 | (64, 64, 512) | Activation_43 | (16, 16, 2048) |
| Activation_19 | (64, 64, 512) | Activation_46 | (16, 16, 2048) |
| Activation_22 | (64, 64, 512) | Activation_49 | (16, 16, 2048) |
| Activation_25 | (32, 32, 1024) | Merging extracted activations | 15168 |

FIG. 8

|  | PCA dimensions | | | | | | | | | | |
|---|---|---|---|---|---|---|---|---|---|---|---|
|  | 10 | 11 | 12 | 13 | 14 | 15 | 16 | 17 | 18 | 19 | 20 |
| 10 |  |  |  |  |  |  |  |  |  |  |  |
| 20 |  |  |  |  |  |  |  |  |  |  |  |
| 30 |  |  |  |  |  |  |  |  |  |  |  |
| 40 |  |  |  |  |  |  |  |  |  |  |  |
| 50 |  |  |  |  |  |  |  |  |  |  |  |
| 60 |  |  |  |  |  |  |  |  |  |  |  |
| 70 |  |  |  |  |  |  |  |  |  |  |  |
| 80 | ▨ |  |  |  |  |  |  |  |  |  |  |
| 90 |  |  |  |  |  |  |  |  |  |  |  |
| 100 |  |  |  |  |  |  |  |  |  |  |  |
| 110 |  |  |  |  |  |  |  |  |  |  |  |
| 120 |  |  |  |  |  |  |  |  |  |  |  |
| 130 |  |  |  |  |  |  |  |  |  |  |  |
| 140 |  |  |  |  |  |  |  |  |  |  |  |
| 150 |  |  |  |  |  |  |  |  |  |  |  |
| 160 |  |  |  |  |  |  |  |  |  |  |  |
| 170 |  |  |  |  |  |  |  |  |  |  |  |
| 180 |  |  |  |  |  |  |  |  |  |  |  |
| 190 |  |  |  |  |  |  |  |  |  |  |  |
| 200 |  |  |  |  |  |  |  |  |  |  |  |
| 210 |  |  |  |  |  |  |  |  |  |  |  |
| 220 |  |  |  |  |  |  |  |  |  |  |  |
| 230 |  |  |  |  |  |  |  |  |  |  |  |
| 240 |  |  |  |  |  |  |  |  |  |  |  |

GMM components

FIG. 10

|  | Determination of Anomaly | Probability value | Determination of OOD | likelihood |
|---|---|---|---|---|
| 1 | Y | 79.1416 | | |
| 2 | N | 79.5601 | | |
| 3 | | | | |
| 4 | | | | |
| 5 | ⋮ | ⋮ | | |
| 6 | | | | |
| 7 | | | | |
| 8 | | | Y | |
| 9 | | | Y | |
| 10 | | | | |
| 11 | | | | |
| 12 | | | | |
| 13 | ⋮ | ⋮ | | |
| 14 | | | | |
| 15 | | | | |
| ⋮ | | | | |
| X | | | | |

DEEP LEARNING DEVICE AND SYSTEM INCLUDING THE SAME

CROSS-REFERENCE TO RELATED APPLICATIONS

This application claims priority from Korean Patent Application No. 10-2021-0065586 filed on May 21, 2021 in the Korean Intellectual Property Office and from Korean Patent Application No. 10-2021-0092932 filed on Jul. 15, 2021 in the Korean Intellectual Property Office, the disclosure of which is incorporated herein by reference in its entirety.

BACKGROUND

1. Technical Field

The present disclosure relates to a deep learning device and a system including the same.

2. Description of the Related Art

Recently, in semiconductor device manufacturing processes, an information technology (IT) system, big data, and/or artificial intelligence technology have been used to improve the quality and productivity of semiconductor devices and the quality of semiconductor devices have been predicted and/or analyzed using machine learning and/or deep learning for, e.g., quality control. For example, an image (e.g., a scanning electron microscopy (SEM) image) of a semiconductor device may be learned through deep learning and whether the semiconductor device is defective may be determined using a trained model.

In this case, the performance of deep learning may be degraded due to images that are out of distribution (OOD) of the learned images. Therefore, there is a growing need to detect OOD data and efficiently restore the performance of deep learning degraded due to the OOD data.

SUMMARY

Aspects of the present disclosure provide a deep learning device for efficiently detecting out-of-distribution (OOD) data to maintain the performance thereof.

Aspects of the present disclosure also provide a system including a deep learning device for efficiently detecting OOD data to maintain the performance thereof.

It should be noted that objects of the present invention are not limited to the above-described objects, and other objects of the present invention will be apparent to those skilled in the art from the following descriptions.

According to an aspect of the present inventive concepts, there is provided a deep learning device comprising processing circuitry configured to determine whether a received image is abnormal using an anomaly detection model, merge at least some vectors extracted from the anomaly detection model, perform a principal component analysis (PCA) on a result of the merging the at least some vectors, input, to a probability approximation model, principal components generated by the PCA to detect whether out of distribution (OOD) occurs in data of the received image, store, in a database, a result of the determination of whether the received image is abnormal and a result of determining whether the OOD occurs, and extract at least some the data in which the OOD occurs, as target labeling, using a target labeling extraction model when a rate of the data in which the OOD occurs is greater than or equal to a threshold value, wherein the anomaly detection model determines whether the received image is abnormal using the target labeling.

According to an aspect of the present inventive concepts, there is provided a deep learning system comprising an input unit configured to receive an image; a processor configured to control the input unit; and a deep learning device connected to the processor and configured to receive the image from the input unit, the deep learning device including processing circuitry and a database, the processing circuitry configured to determine whether an image received from the input unit is abnormal using an anomaly detection model, merge at least some vectors extracted from the anomaly detection model, perform a principle component analysis (PCA) on a result of the merging the at least some vectors, input, to a probability approximation model, principal components generated by the PCA to detect whether out of distribution (OOD) occurs in data of the image, store a result of the determination of whether the image is abnormal and a result of determining whether the OOD occurs, and extract at least some the data in which the OOD occurs, as target labeling, using a target labeling extraction model when a rate of the data in which the OOD occurs is greater than or equal to a threshold value, and the database is configured to store the result of the determination of whether the image is abnormal and the result of determining whether the OOD occurs, and wherein the anomaly detection model determines whether the image is abnormal using the target labeling.

According to an aspect of the present inventive concepts, there is provided a deep learning system comprising an input unit configured to receive an image; a processor configured to control the input unit; and a deep learning device connected to the processor and configured to receive the image from the input unit, the deep learning device including processing circuitry configured to determine whether an image received from the input unit is abnormal using an anomaly detection model, merge at least some vectors extracted from the anomaly detection model, perform a principle component analysis (PCA) on a result of the merging the at least some vectors, input, to a probability approximation model, principal components generated by the PCA to detect whether out of distribution (OOD) occurs in data of the image, store, in a database, a result of the determining whether the image is abnormal and the result of determining whether the OOD occurs, and extract at least some pieces of data in which the OOD occurs using a target labeling extraction model when a rate of data in which the OOD occurs with respect to the image stored in the database is greater than or equal to a threshold value, wherein the anomaly detection model determines whether the image is abnormal using the target labeling.

BRIEF DESCRIPTION OF THE DRAWINGS

The above and other aspects and features of the present disclosure will become more apparent by describing exemplary embodiments thereof in detail with reference to the attached drawings, in which:

FIG. 7 is a table for describing an operation of merging at least some of vectors extracted from an anomaly detection model according to some embodiments.

FIG. 8 is a table for describing an operation of an OOD data detection unit according to some embodiments.

FIG. 10 is a table for describing data stored in a database according to some embodiments.

DETAILED DESCRIPTION OF THE EMBODIMENTS

Figure 1:
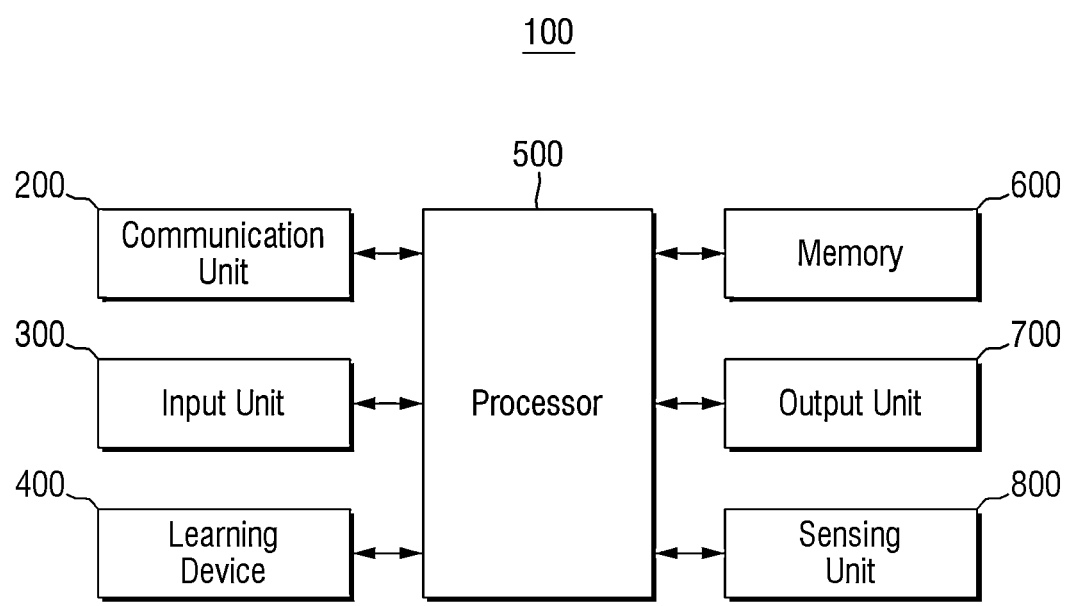
FIG. 1 is a block diagram for describing a system including a deep learning device according to some embodiments.

FIG. 1 is a block diagram for describing a system including a deep learning device according to some embodiments.

Referring to FIG. 1, a deep learning system 100 according to some embodiments may be embodied in and/or as, for example, a fixed or movable device such as a TV, a projector, a cellular phone, a smart phone, a desktop computer, a notebook computer, a digital broadcasting terminal, a personal digital assistant (PDA), a portable multimedia player (PMP), a navigation device, a tablet personal computer (PCf), a wearable device, a set-top box (STB), a digital multimedia broadcasting (DMB) receiver, a radio, a robot, a vehicle, and/or the like.

The deep learning system 100 includes a communication unit 200, an input unit 300, a deep learning device 400 a processor 500, a memory 600, an output unit 700, and a sensing unit 800. A configuration of the deep learning system 100 is not limited thereto. For example, though illustrated as separate components, some of the components of the deep learning system 100 may be combined and/or other components may be further included.

The communication unit 200 may transmit data to and/or receive data from other external electronic devices (e.g., electronic devices 100a to 100e of FIG. 16) using a wired/wireless communication technique. For example, the communication unit 200 may exchange at least one of sensor information, a user input, a learning model, a control signal, etc. with the external devices.

Some examples of communication technology that may be employed by the communication unit 200 may include, but are not limited to, Global System for Mobile (GSM) communication, Code Division Multi Access (CDMA), Long-Term Evolution (LTE), 5G, Wireless LAN (WLAN), Wireless-Fidelity (Wi-Fi), Bluetooth, Radio Frequency Identification (RFID), Infrared Data Association (IrDA), ZigBee, Near Field Communication (NFC), and/or the like.

The input unit 300 may obtain various types of data. In this case, the input unit 300 may include a camera for receiving image signals, a microphone for receiving audio signals, a user input unit for receiving information from a user, and/or the like. Here, the camera and/or the microphone may be regarded as a sensor and a signal obtained from the camera and/or the microphone may be referred to as sensing data and/or sensor information. In some embodiments, the input unit 300 may obtain and/or process signals from an external device (e.g., through the communication unit 200).

The input unit 300 may obtain training data for training a deep learning model by the deep learning device 400 and/or input data to be used to obtain an output using a deep learning model. The input unit 300 may obtain input raw data, and in this case, the deep learning device 400 may extract input feature points by preprocessing the input raw data received from the input unit 300.

For example, the input unit 300 may obtain images (e.g., scanning electron microscopy (SEM) images) of a semiconductor device and/or a semiconductor device manufacturing process and transmit the images to the deep learning device 400.

The deep learning device 400 may train a model configured as an artificial neural network with data (e.g., images) received from the input unit 300. Here, the trained artificial neural network may also be referred to as a learning model. The learning model may be used to infer a result value with respect to new input data other than training data, and the inferred result value may be used as a basis of judgment for performing an operation.

In this case, the deep learning device 400 may perform deep learning processing through a learning processor 460 (as in FIG. 3) included therein.

In some embodiments, the deep learning device 400 may be implemented using an external memory connected directly to the memory 600 and/or a memory included in an external device.

The sensing unit 800 may obtain at least one among information stored in the deep learning device 400, information about surroundings of the deep learning device 400, and user information using various types of sensors.

In this case, sensors included in the sensing unit 800 may include a proximity sensor, an illumination sensor, an acceleration sensor, a magnetic sensor, a gyro sensor, an inertial sensor, an RGB sensor, an IR sensor, a fingerprint sensor, an ultrasonic sensor, an optical sensor, a microphone, a light detection and ranging (LiDAR) sensor, a radar device, and/or the like. As noted above, in some embodiments, the input unit 300 and the sensing unit 800, though illustrated as separate components, may be combined and/or share sensors and/or inputs (e.g., camera(s) and/or microphone(s)).

The output unit 700 may generate an output associated with a sense of vision, hearing, or touch. For example, the output unit 700 may include a display unit for outputting video information, a speaker for outputting audio information, a haptic module for outputting tactile information, and/or the like.

The memory 600 may store data that supports various functions of the deep learning device 400. For example, the memory 600 may store input data, training data, a learning model, learning history, etc. obtained, e.g., by the deep learning device 400, the input unit 300 and/or the communication unit 200.

The learning model may be used to infer a result value with respect to new input data other than training data, and the inferred result value may be used as a basis of judgment for performing an operation.

The processor 500 may control overall operations of the deep learning system 100. The processor 500 may obtain information about an intention with respect to a user input and identify a user's requirements on the basis of the obtained information. The processor 500 may control at least some of the components of the deep learning device 400 to execute and/or to drive an application program stored in the memory 600. Furthermore, the processor 500 may combine and operate two or more of the components of the deep learning device 400 to drive the application program.

Figure 2:
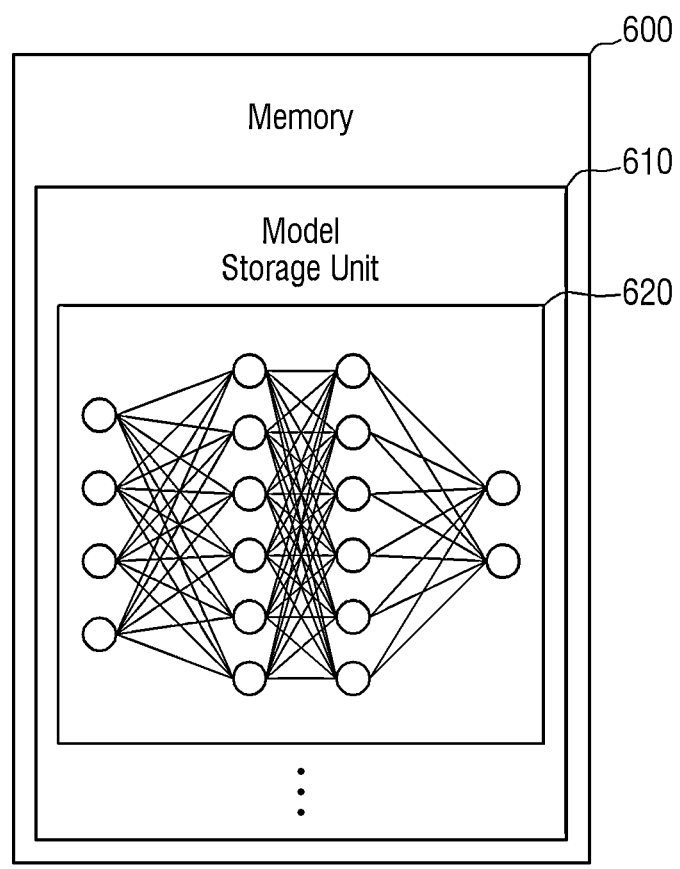
FIG. 2 is a block diagram for describing the memory 600 of FIG. 1.

FIG. 2 is a block diagram for describing the memory 600 of FIG. 1.

Referring to FIGS. 1 and 2, the memory 600 may include a model storage unit 610. The model storage unit 610 may store a model (and/or artificial neural network) 620 that is being trained or is trained through the deep learning device 400.

Referring to FIGS. 1 and 2, the deep learning device 400 learns a representation (e.g., an SEM image) of a semiconductor device, which is provided through the input unit 300, and determines whether the semiconductor device is defective using a trained model. For example, if the deep learning device 400 determines a semiconductor device is defective, the deep learning device 400 may, based on the type of defect and/or configuration of the deep learning device 400 (and/or deep learning system 100), produce a notice of the defect (e.g., an alert), may indicate the semiconductor device should be reprocessed and/or discarded, indicate the semiconductor device production apparatus requires maintenance and/or adjustment, and/or the like.

However, in some cases, the performance of the deep learning device 400 may be degraded due to images that are out of distribution (OOD) of the images on which learning of the deep learning device 400 is performed. Therefore, there is a growing need for the deep learning device 400 to detect OOD data and efficiently restore deep learning performance degraded due to the OOD data.

The deep learning device 400 of some embodiments that automatically detects OOD data, including e.g. images serving as a basis for the deep learning, and efficiently restores deep learning performance degraded due to the OOD data will be described in detail below.

Figure 3:
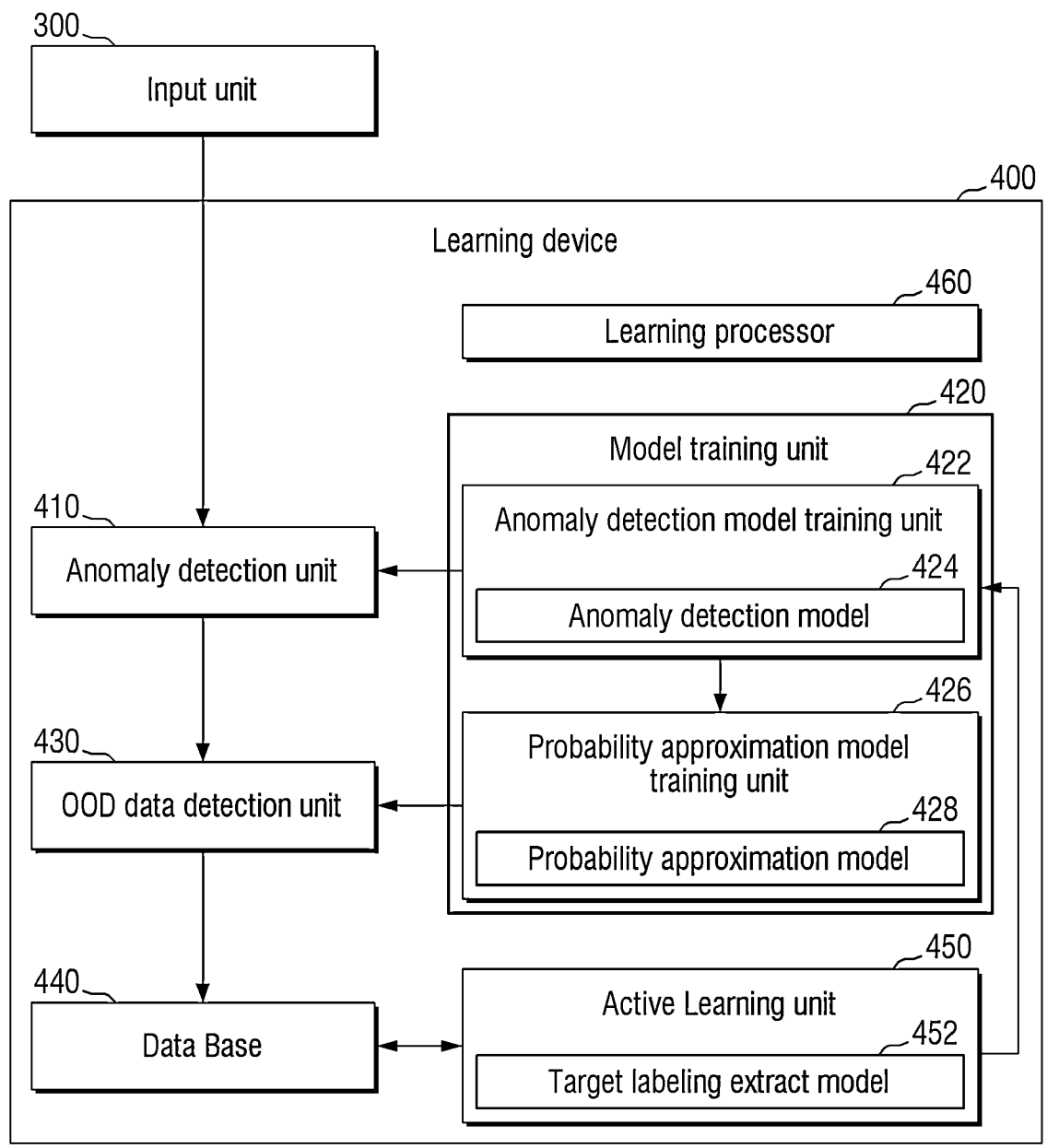
FIG. 3 is a block diagram for describing a deep learning device according to some embodiments.

FIG. 3 is a block diagram for describing a deep learning device according to some embodiments.

Referring to FIGS. 1 and 3, the deep learning device 400 may include an anomaly detection unit 410, an OOD data detection unit 430, a database 440, an active learning unit 450, a model training unit 420, and the learning processor 460.

The deep learning device 400 and/or the components included therein (e.g., the anomaly detection unit 410, the OOD data detection unit 430, the active learning unit 450, the model training unit 420, and the learning processor 460) may include and/or be included in processing circuitry such as hardware including logic circuits; a hardware/software combination such as a processor executing software; or a combination thereof. For example, the processing circuity may include, but is not limited to, a central processing unit (CPU), a memory controller, an arithmetic logic unit (ALU), a digital signal processor, a microcomputer, a field programmable gate array (FPGA), and programmable logic unit, a microprocessor, application-specific integrated circuit (ASIC), etc. The database 440 may be and/or may be included in a storage media. For example, in some embodiments, the memory 600 of FIGS. 1 and 2 may include the database 440.

The anomaly detection unit 410 may determine whether a semiconductor process image received from the input unit 300 is abnormal or not. Examples of the semiconductor process image received from the input unit 300 may be as shown in FIGS. 4 and 5.

Figure 4:
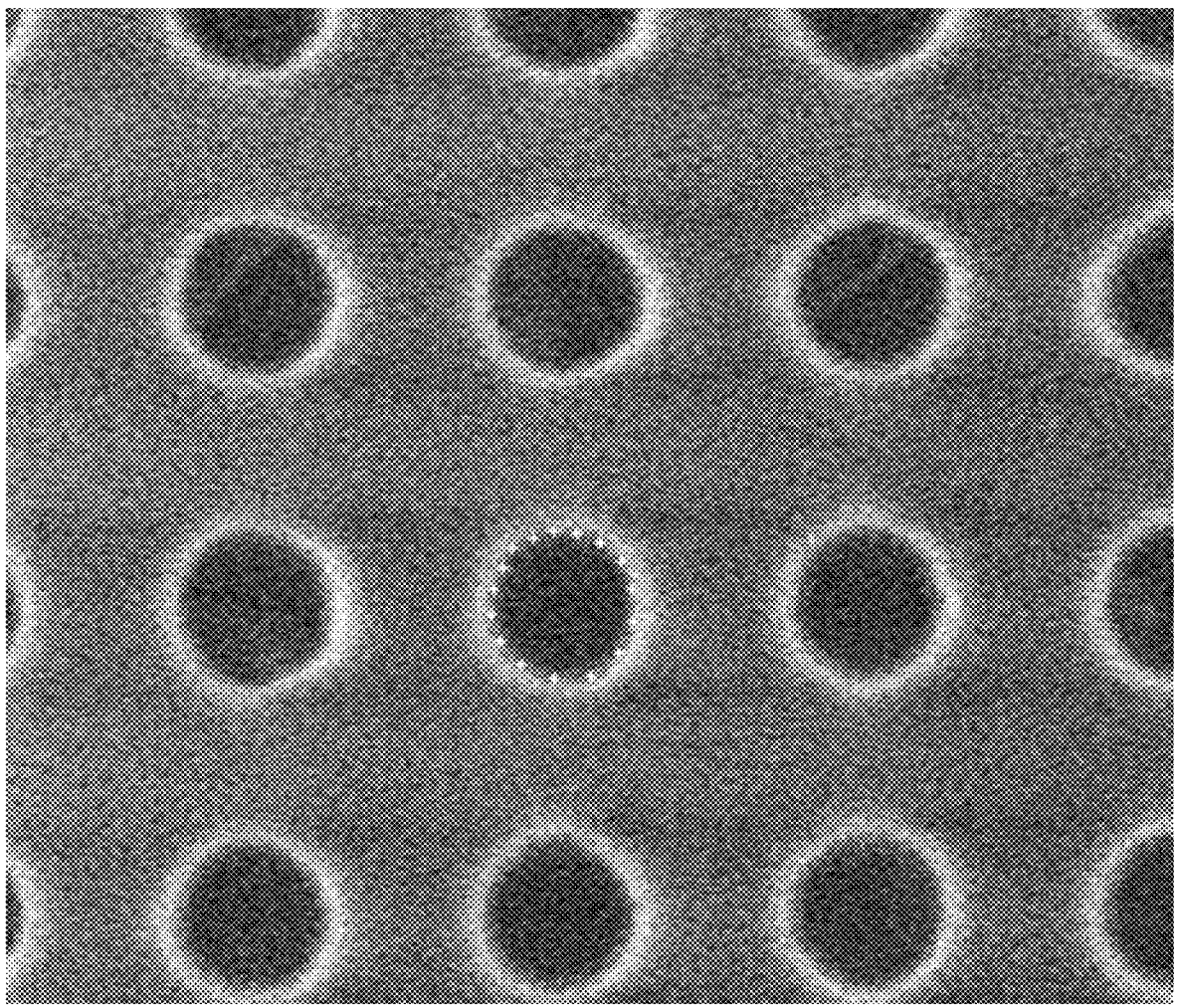
FIGS. 4 and 5 are diagrams for explaining examples of an input image.
Figure 5:
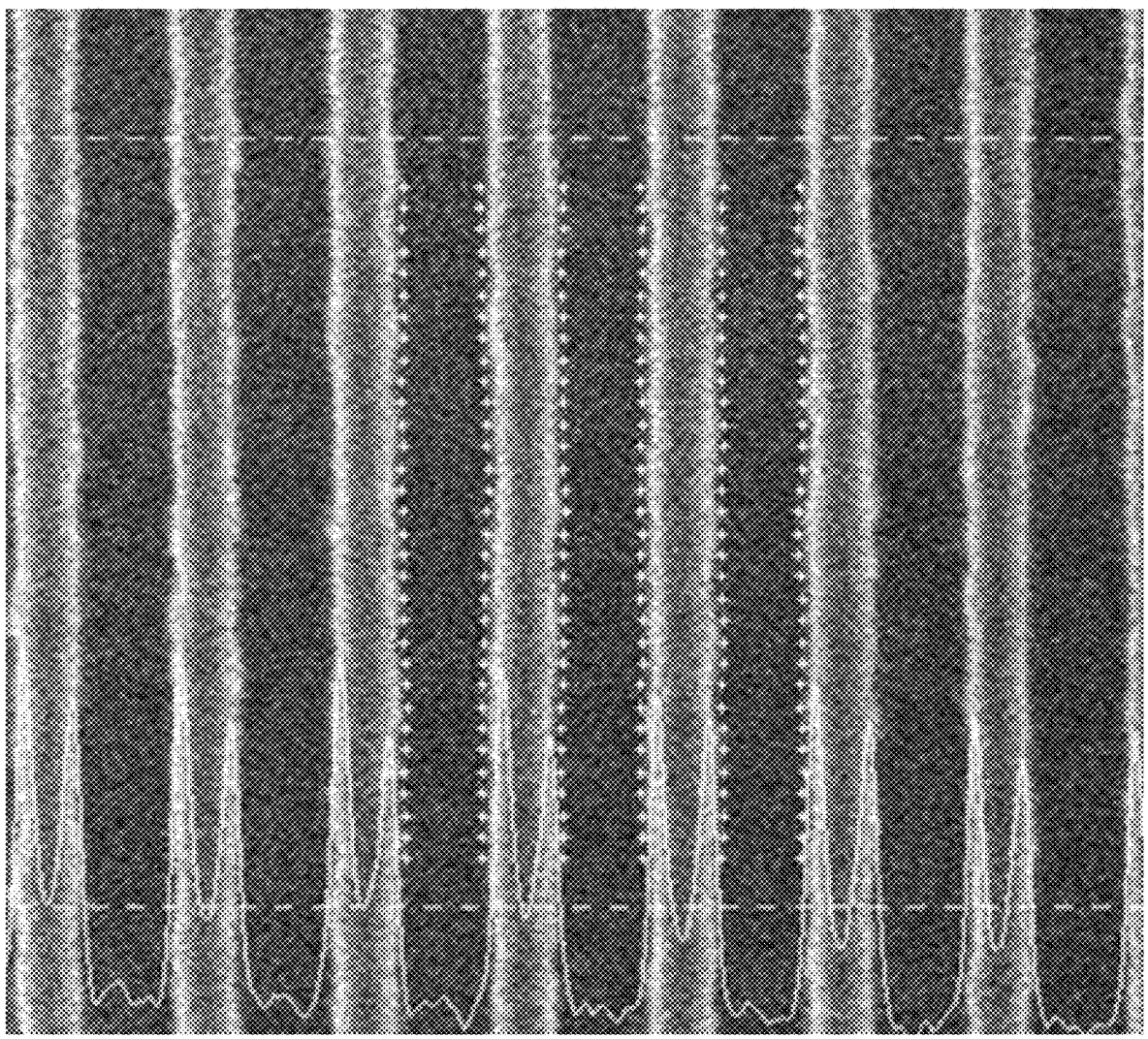

FIGS. 4 and 5 are diagrams for explaining examples of an input image.

Referring to FIG. 4, a semiconductor process image received from the input unit 300 may be, for example, an image of a channel hole.

Referring to FIG. 5, a semiconductor process image received from the input unit 300 may be, for example, an image of a word line cut.

However, the images received from the input unit 300 are not limited to the semiconductor process images of FIGS. 4 and 5 and may be, for example, various semiconductor process images.

Referring back to FIGS. 1 and 3, the anomaly detection unit 410 may determine whether a semiconductor process image is abnormal using a model trained through an anomaly detection model 424.

For example, the anomaly detection model 424 may be a learning model included in an anomaly detection model training unit 422 of the model training unit 420.

The anomaly detection model 424 may perform learning, for example, on the basis of semiconductor process images labeled as normal and semiconductor process images labeled as abnormal.

A learning model used by the anomaly detection model 424 may be, for example, a convolutional neural network (CNN). However, the learning model used by the anomaly detection model 424 is not limited thereto and may be various network learning models based on a CNN. For example, the learning model used by the anomaly detection model 424 may be and/or include deep convolutional neural networks (e.g., AlexNet and/or GoogleNet), artificial neural networks (ANN) (e.g., residual neural networks ("ResNet")), dense convolutional networks ("DenseNet"), and/or scaled CNNs (e.g., EfficientNet). Alternatively and/or additionally, the learning model may include other types of machine learning models, for example, linear and/or logistic regression, statistics clustering, Bayesian classification, determination trees, dimensional reduction such as main component analyses, expert systems, and/or random forests, and/or a combination thereof.

For example, the learning model may additionally and/or alternatively include artificial neural network organizations and processing models, such as, a repeated neural network (RNN) selectively including a deconvolution neural network, a long short-term memory (LSTM) unit, and/or a gated recurrent unit (GRU), a stacked neural network (SNN), a state-space dynamic neural network (SSDNN), a deep faith network (DBN), a generative adversarial network (GAN), and/or a restricted Boltzmann machine (RBM).

In some embodiments, the anomaly detection unit 410 may determine whether semiconductor process images are abnormal through the anomaly detection model 424 on the basis of images input from the input unit 300.

In this case, OOD may occur in the images learned by the anomaly detection model training unit 422. Therefore, whether OOD data is generated may be detected through the OOD data detection unit 430.

For example, the OOD data detection unit 430 may detect, through a probability approximation model 428, whether OOD data is generated in the images learned by the anomaly detection model training unit 422.

In some embodiments, the probability approximation model 428 may be a model included in a probability approximation model training unit 426 in the model training unit 420.

The probability approximation model 428 may use data learned through the anomaly detection model 424, for example, as described in detail with reference to FIG. 6 below.

Figure 6:
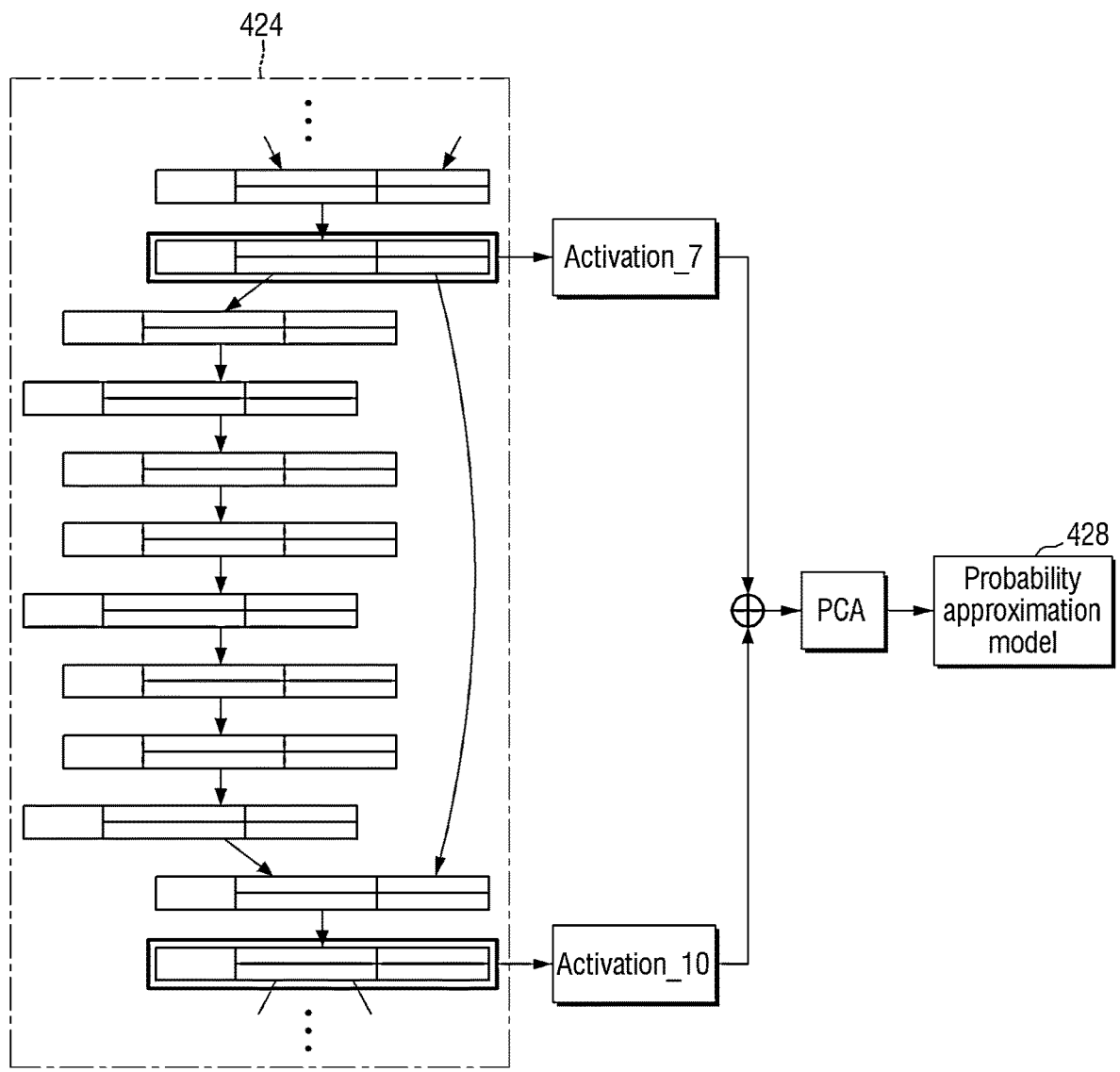
FIG. 6 is a block diagram for describing operations of a deep learning device according to some embodiments.

FIG. 6 is a block diagram for describing operations of a deep learning device according to some embodiments.

Referring to FIGS. 1, 3, and 6, the probability approximation model 428 may use data learned through the anomaly detection model 424. In FIG. 6, it is assumed that a learning model used by the anomaly detection model 424 is ResNet50.

The probability approximation model training unit 426 may merge at least some of vectors extracted from the anomaly detection model 424.

For example, the probability approximation model training unit 426 may merge a plurality (e.g., seventeen) of activation layers among vectors extracted from the anomaly detection model 424. The number of activation layers merged by the probability approximation model training unit 426 is, however, not limited to seventeen.

Thereafter, the probability approximation model training unit 426 may perform a principal component analysis (PCA) on the merged activation layers to generate a principal component.

The probability approximation model training unit 426 may use the principal component as an input of the probability approximation model 428. The probability approximation model 428 may be and/or include, for example, a Gaussian Mixture Model (GMM). However, the probability approximation model 428 is not limited thereto and may be and/or include at least one of a histogram-based model, a Kernel density estimation model, a Parzen window estimation model, a k-nearest neighbor estimation model, a k-means clustering model, and/or the like.

An operation of the probability approximation model training unit 426 will be described with reference to FIG. 7 below.

FIG. 7 is a table for describing an operation of merging at least some of vectors extracted from an anomaly detection model according to some embodiments.

The probability approximation model training unit 426 may merge, for example, seventeen activation layers among vectors extracted from the anomaly detection model 424. The number of activation layers merged by the probability approximation model training unit 426 is, however, not limited to seventeen.

For example, the probability approximation model training unit 426 may merge a first activation layer Activation_1, a fourth activation layer Activation_4, a seventh activation layer Activation_7, a tenth activation layer Activation_10, a thirteenth activation layer Activation_13, a sixteenth activation layer Activation_16, a nineteenth activation layer Activation_19, a twenty-second activation layer Activation_22, a twenty-fifth activation layer Activation_25, a twenty-eighth activation layer Activation_28, a thirty-first activation layer Activation_31, a thirty-fourth activation layer Activation_34, a thirty-seventh activation layer Activation_37, a fortieth activation layer Activation_40, a forty-third activation layer Activation_43, a forty-sixth activation layer Activation_46, and a forty-ninth activation layer Activation_49.

An example output of each of these activation layers may be as shown in FIG. 7. For example, an output of the first activation layer Activation_1 may be (256, 256, 64), an output of the fourth activation layer Activation_4 may be (128, 128, 256), an output of the seventh activation layer Activation_7 may be (128, 128, 256), an output of the tenth activation layer Activation_10 may be (128, 128, 256), an output of the thirteenth activation layer Activation_13 may be (64, 64, 512), an output of the sixteenth activation layer Activation_16 may be (64, 64, 512), an output of the nineteenth activation layer Activation_19 may be (64, 64, 512), an output of the twenty-second activation layer Activation_22 may be (64, 64, 512), an output of the twenty-fifth activation layer Activation_25 may be (32, 32, 1024), an output of the twenty-eighth activation layer Activation_28 may be (32, 32, 1024), an output of the thirty-first activation layer Activation_31 may be (32, 32, 1024), an output of the thirty-fourth activation layer Activation_34 may be (32, 32, 1024), an output of the thirty-seventh activation layer Activation_37 may be (32, 32, 1024), the fortieth activation layer Activation_40 may be (32, 32, 1024), an output of the forty-third activation layer Activation_43 may be (16, 16, 2048), an output of the forty-sixth activation layer Activation_46 may be (16, 16, 2048), and an output of the forty-ninth activation layer Activation_49 may be (16, 16, 2048). The outputs of these activation layers are merely examples and are not limited thereto.

An output may be obtained by merging the plurality of activation layers, For example, the output obtained through the probability approximation model training unit 426 by merging the first activation layer Activation_1, the fourth activation layer Activation_4, the seventh activation layer Activation_7, the tenth activation layer Activation_10, the thirteenth activation layer Activation_13, the sixteenth activation layer Activation_16, the nineteenth activation layer Activation_19, the twenty-second activation layer Activation_22, the twenty-fifth activation layer Activation_25, the twenty-eighth activation layer Activation_28, the thirty-first activation layer Activation_31, the thirty-fourth activation layer Activation_34, the thirty-seventh activation layer Activation_37, the fortieth activation layer Activation_40, the forty-third activation layer Activation_43, the forty-sixth activation layer Activation_46, and the forty-ninth activation layer Activation_49 may be 15168. The output of the anomaly detection model 424 illustrated in FIG. 7 is merely an example, and the output of the anomaly detection model 424 is not limited thereto.

Referring to FIGS. 1, 3, and 6, the probability approximation model training unit 426 may use output data of the anomaly detection model 424 as an input of the probability approximation model 428.

Referring to FIGS. 1 and 3, the OOD data detection unit 430 may use the probability approximation model 428 to detect whether OOD data of an image, which is to be learned by the anomaly detection model 424, is generated.

The OOD data detection unit 430 may detect an optimal value, for clustering, by setting dimensions of outputs (PCA dimensions) of a principal component, which are generated through the PCA performed by the probability approximation model training unit 426, and the number of probability approximation models 428 as hyper parameters, for example, as will be described with reference to FIG. 8 below.

FIG. 8 is a table for describing an operation of an OOD data detection unit according to some embodiments.

Referring to FIGS. 1, 3, and 8, an example in which the probability approximation model 428 is a GMM will be described.

The OOD data detection unit 430 may detect an optimal value, for clustering, by setting, as hyper parameters PCT, dimensions of a principal component generated through the PCA performed by the probability approximation model training unit 426 and the number of probability approximation models 428.

The OOD data detection unit 430 may detect an optimal value using, e.g., a Bayesian information criterion (BIC) and by setting, as hyper parameters, the PCA dimensions of a principal component generated through the PCA performed by the probability approximation model training unit 426 and the number of probability approximation models 428. However, embodiments are not limited thereto, and the OOD data detection unit 430 may detect an optimal value by using an Dunn index, a silhouette score, an Akaike information criterion (AIC), and/or the like; and setting the PCA dimensions of a principal component generated through the PCA performed by the probability approximation model training unit 426 and the number of probability approximation models 428 as hyper parameters. For ease of description, in this drawing, an example in which the OOD data detection unit 430 uses the BIC will be described.

For example, the OOD data detection unit 430 increases the PCA dimensions of the principal component by 1 from 10 to 20. In addition, the OOD data detection unit 430 increases the number of GMMs (and/or GMM components) by 10 from 10 to 240. Accordingly, a BIC for PCA dimensions of each principal component and the number of GMMS (and/or GMM components) may be calculated, and PCA dimensions of the principal component and the number of GMMS (and/or GMM components) corresponding to a lowest BIC may be determined as optimal values.

In this drawing, it may be determined that an optical value is obtained when the PCA dimensions of the principal component are 10 and the number of GMMS (and/or GMM components) is 80, but examples embodiments are not so limited.

Therefore, the OOD data detection unit 430 may detect OOD data using the probability approximation model 428 by setting the PCA dimensions of the principal component to 10 and the number of GMMs (and/or GMM components) to 80.

The operations of the anomaly detection unit 410 and the OOD data detection unit 430 will be described using a ladder diagram of FIG. 9 below.

Figure 9:
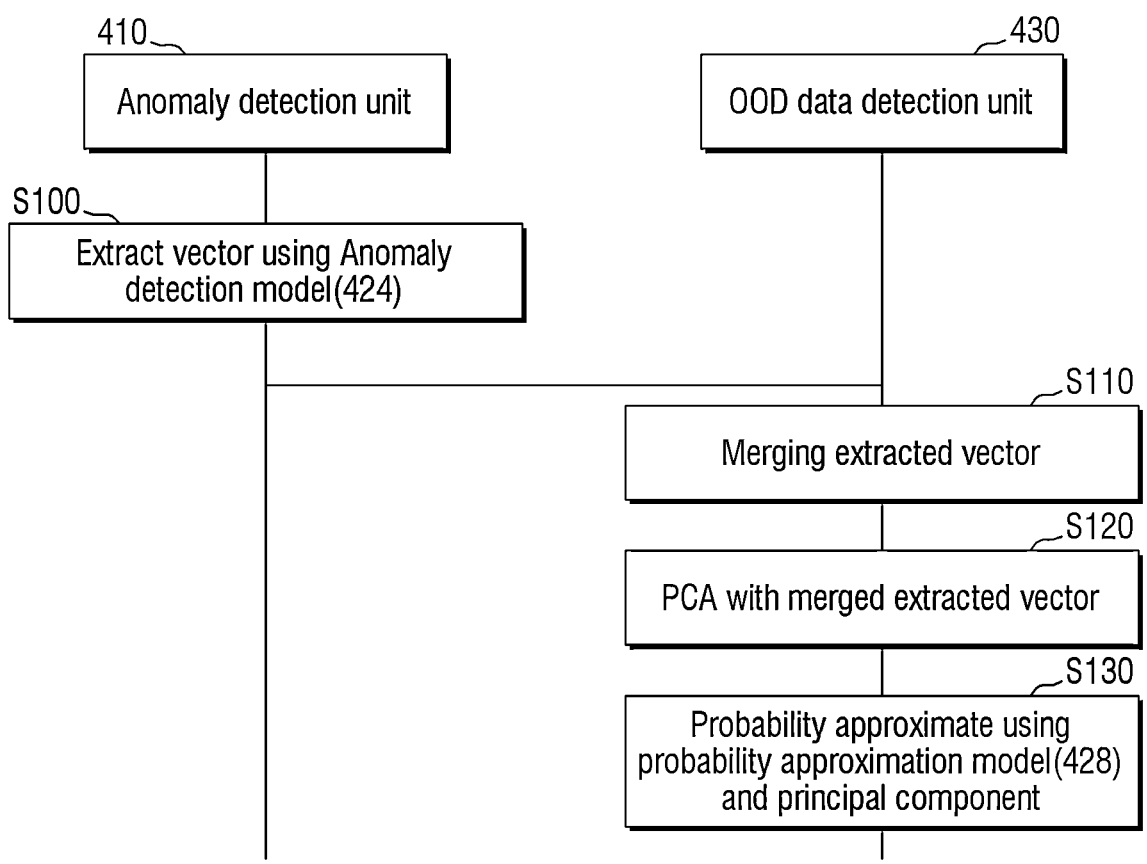
FIG. 9 is a ladder diagram for describing detecting anomaly and detecting OOD data according to some embodiments.

FIG. 9 is a ladder diagram for describing detecting anomaly and detecting OOD data according to some embodiments.

Referring to FIGS. 1, 3 and 9, first, the anomaly detection unit 410 determines, e.g., by using the anomaly detection model 424, whether an image received through the input unit 300 is abnormal. In this case, features (e.g., vectors) of the image may be extracted through the anomaly detection model 424 (S100).

Next, the OOD data detection unit 430 may extract and merge some vectors of data output through the anomaly detection model 424 (S110).

Next, the OOD data detection unit 430 may perform the PCA on a result of merging the extracted vectors (S120).

Thereafter, the OOD data detection unit 430 may perform probability approximation using a condition for detecting an optimal value between PCA dimensions of principal components and the number of probability approximation models 428 to detect whether OOD occurs in the image received through the input unit 300 (S130).

Referring back to FIGS. 1 and 3, a result of detecting whether an image is abnormal (e.g., by the anomaly detection unit 410) and a result of detecting whether OOD occurs (e.g., by the OOD data detection unit 430) may be stored in the database 440. Data stored in the database 440 is not limited thereto. The data stored in the database 440 will be described in detail with reference to FIG. 10 below.

FIG. 10 is a table for describing data stored in a database according to some embodiments.

Referring to FIGS. 1, 3, and 10, information about X pieces of data (e.g., a semiconductor process image) (wherein X is and/or represents a natural number) received from the input unit 300 may be stored in the database 440.

The X pieces of the data stored in the database 440 may indicate a determination of anomaly, a probability value, a determination of OOD, a likelihood, and/or the like.

More specifically, the determination of anomaly may indicate a result of detecting whether the image is abnormal (e.g., by the anomaly detection unit 410). For example, when the anomaly detection unit 410 detects anomaly in first data 1, an indication (e.g., "Y" indicating the anomaly) may be stored. When the anomaly detection unit 410 does not detect anomaly in second data 2, "N" may be stored.

The probability value indicates a probability that a result of detecting whether an image is abnormal by the anomaly detection unit 410 is correct. For example, when a probability that a result of detecting whether the first data 1 is abnormal by the anomaly detection unit 410 is correct and is 79.1416%, 79.1416 may be recorded. For example, when a probability that a result of detecting whether the first data 2 is abnormal by the anomaly detection unit 410 is correct and is 79.5601%, 79.5601 may be recorded.

For convenience of description, a description of remaining data (third data to Xth data) will be omitted herein.

The determination of OOD may indicate a result of determining (e.g., by the OOD data detection unit 430) whether the image received from the input unit 300 is OOD data. For example, when the OOD data detection unit 430 determines that eighth data 8 and ninth data 9 are OOD data, the determination of OOD, with respect to the eighth data and the ninth data, may be recorded as Y.

The likelihood may be a likelihood of each piece of the data calculated by the probability approximation model 428.

The deep learning processor 460 may determine at least one executable operation of the deep learning device 400 on the basis of information determined and/or generated by a data analysis algorithm and/or a machine learning algorithm. In addition, the learning processor 460 may control the components of the deep learning device 400 to perform the determined operation.

To this end, the learning processor 460 may request, retrieve, receive, and/or use the data stored in the memory 600, and control the components of the deep learning device 400 to perform an expected operation and/or otherwise desirable operation among the at least one executable operation.

In this case, when it is necessary and/or otherwise desirable to connect to an external device in order to perform the determined operation, the learning processor 460 may generate a control signal for controlling the external device and transmit the control signal to the external device.

In addition, the learning processor 460 may collect history information including data about the operation of the deep learning device 400 or a user's feedback on the operation of the deep learning device 400 and store the history information in the memory 600 or transmit the history information to the external device. The collected history information may be used to update a learning model.

As a ratio of the number of pieces of data in which OOD occurs to the total number X of pieces of data stored in the database 440 increases, the performance of the deep learning device 400 according to some embodiments may decrease, e.g., as will be described in detail with reference to FIG. 11 below.

Figure 11:
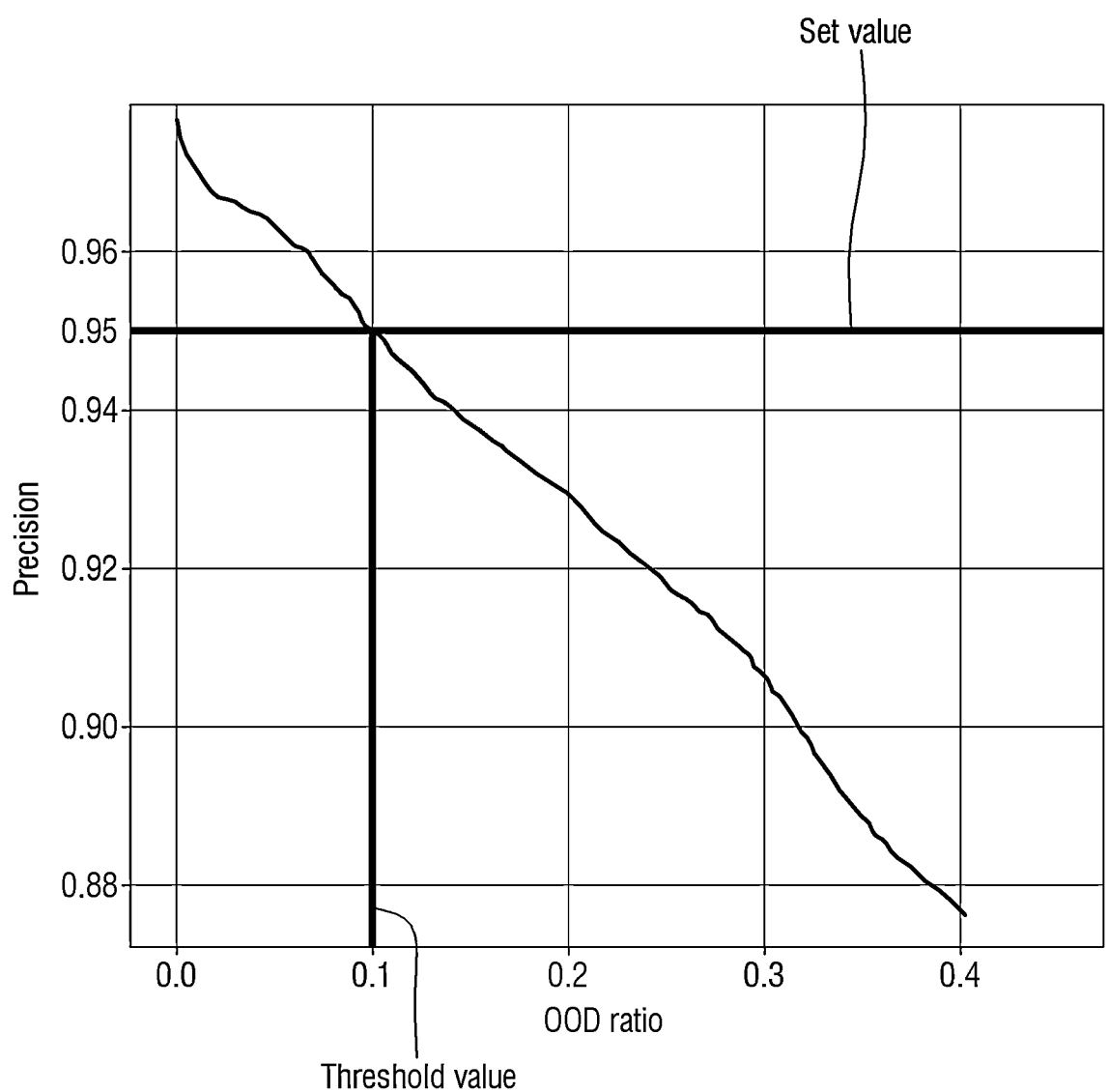
FIG. 11 is a graph for describing a process of determining a threshold value.

FIG. 11 is a graph for describing a process of determining a threshold value.

Referring to FIGS. 1, 3, 10, and 11, as a ratio of the number of pieces of data in which OOD occurs compared to the total number X of pieces of data stored in the database 440 increases from 0 to 1, the performance of the deep learning device 400 decreases. The graph of FIG. 11 is only an example and various types of graphs may be used provided that, as a ratio of the number of pieces of data in which OOD occurs to the total number X of pieces of data stored in the database 440 increases from 0 to 1, the performance of the deep learning device 400 decreases.

The performance of the deep learning device 400 may be, for example, the performance accuracy of the anomaly detection unit 410. For example, the performance of the deep learning device 400 may refer to the precision of a result of detecting, e.g., by the anomaly detection unit 410, whether an image received from the input unit 300 is abnormal and/or includes OOD.

In some embodiments, a user of the deep learning device 400 may set a set value serving as a reference value for determining whether the performance of the deep learning device 400 is available. For example, when a user sets that the deep learning device 400 is not reliable when the performance of the deep learning device 400 is less than or equal to 0.95, the set value may be 0.95.

The learning processor 460 may continuously check a ratio of the number of pieces of data in which OOD occurs to the total number X of pieces of data stored in the database 440. In this case, the learning processor 460 may continuously monitor whether an OOD ratio (e.g., a ratio of the number of pieces of data in which OOD occurs to the total number X of pieces of data stored in the database 440) is equal to a threshold value.

For example, when the set value set by a user is 0.95, the OOD ratio is 0.1 and thus the learning processor 460 monitors whether an OOD ratio of the database 440 is 0.1.

In this case, when it is determined that the OOD ratio of the database 440 reaches the threshold value, the learning processor 460 may inform a user of this fact and/or control the active learning unit 450 to extract, as target labeling, at least part of data in which OOD occurs. For example, the learning processor 460, to inform the user, may initiate and/or generate a notification for the user.

According to some embodiments, the deep learning device 400 may monitor an OOD ratio satisfying a predetermined (and/or otherwise determined) allowable value of the performance of the deep learning device 400, and automatically enhance degraded performance of the deep learning device 400 when it is determined that the OOD ratio falls below the allowable value (e.g., reaches a threshold value). Therefore, the performance of the deep learning device 400 may be efficiently maintained.

In addition, because the performance of the deep learning device 400 is improved by extracting, as target labeling, at least part of data in which OOD occurs, degraded performance of the deep learning device 400 may be restored without having to use all the data in which OOD occurs, thereby efficiently maintaining the performance of the deep learning device 400.

Next, an operation of the active learning unit 450 will be described. The active learning unit 450 may extract target labeling to be transmitted to the model training unit 420 among data in which OOD occurs. In this case, the active learning unit 450 may extract target labeling on the basis of at least some of vectors of data output through the anomaly detection model 424 and a likelihood calculated by the OOD data detection unit 430.

For example, the active learning unit 450 may extract at least part of data in which OOD occurs as target labeling through a target labeling extraction model 452. The target labeling extraction model 452 may be, for example, k-center greedy and/or gradient embedding (e.g., Deep Batch Active Learning by Diverse and/or Uncertain Gradient Lower Bounds) using at least some of vectors of data output through the anomaly detection model 424 and a likelihood calculated by the OOD data detection unit 430.

For example, the active learning unit 450 may extract, as target labeling, a percentage (e.g., 10%) of the data in which OOD occurs.

According to some embodiments, the deep learning device 400 may restore the performance of the deep learning device 400, which is degraded, using only some of the data in which OOD occurs. Therefore, the performance of the deep learning device 400 may be efficiently managed.

Example operations of the deep learning device 400 described above will be described with reference to the flow of FIG. 12 below.

Figure 12:
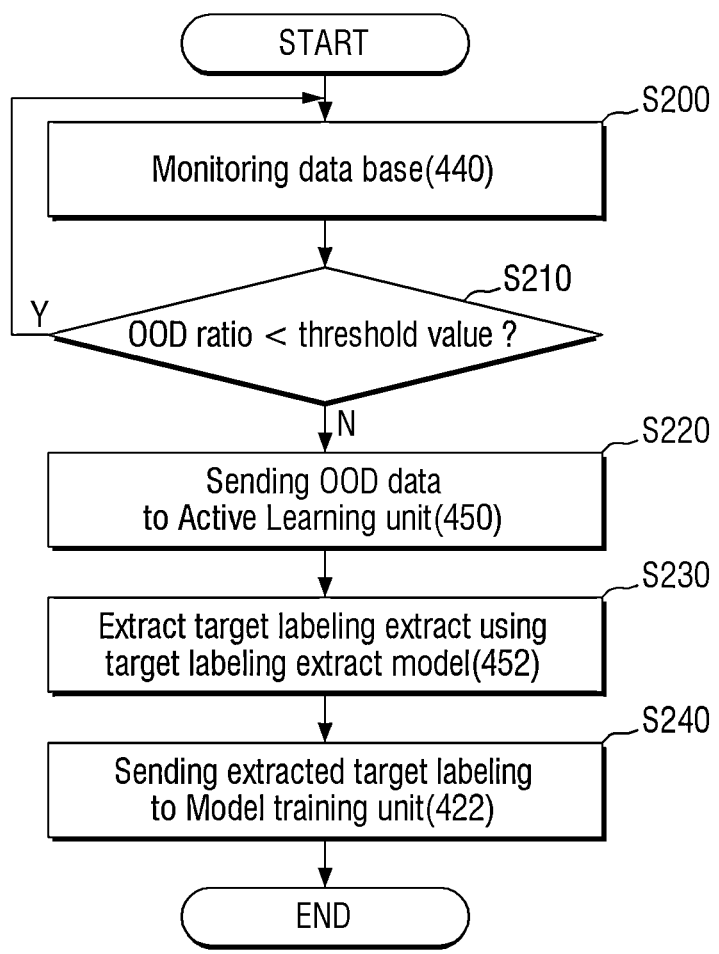
FIG. 12 is a flowchart of operations of a deep learning device according to some embodiments.

FIG. 12 is a flowchart of operations of a deep learning device according to some embodiments.

Referring to FIGS. 1, 3, and 12, the database 440 is monitored through the learning processor 460 (S200). Thereafter, whether an OOD ratio is less than a threshold value is determined (e.g., by the learning processor 460) (S210). For example, when it is determined that the OOD ratio is less than the threshold value (Y), the learning processor 460 may continue to (and/or continuously) monitor the performance of the deep learning device 400.

However, when it is determined by the learning processor 460 that the OOD ratio is greater than (and/or equal) to the threshold value (N), data in which OOD occurs among data stored in the database 440 may be transmitted to the active learning unit 450 (S220).

Thereafter, the active learning unit 450 extracts target labeling through the target labeling extraction model 452 (S230). The active learning unit 450 transmits the extracted target labeling to the model training unit 420 (S240).

An example process of detecting, by the deep learning device 400, the occurrence of OOD and restoring the graded performance of the deep learning device 400, e.g., according to some embodiments, will be described with reference to FIG. 13.

Figure 13:
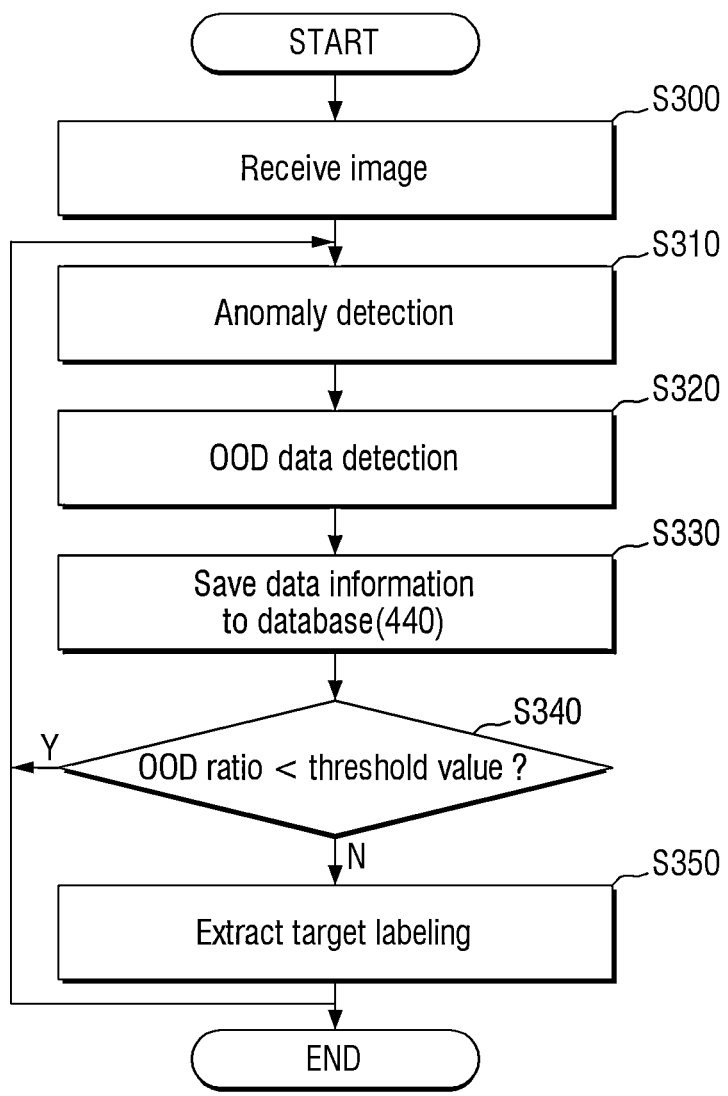
FIG. 13 is a flowchart of operations of a deep learning device according to some embodiments.

FIG. 13 is a flowchart of operations of a deep learning device according to some embodiments.

Referring to FIGS. 1, 3, and 13, the deep learning device 400 receives an image (e.g., through the input unit 300) (S300). Next, whether the image is abnormal is determined (e.g., by the anomaly detection unit 410) (S310). For example, the anomaly detection unit 410 may use the anomaly detection model 424 of the model training unit 420.

Thereafter, whether OOD occurs in the received image may be determined (e.g., by the OOD data detection unit 430) (S320). For example, the OOD data detection unit 430 may use the probability approximation model 428 of the model training unit 420.

Thereafter, a result of determining whether the image is abnormal (e.g., by the anomaly detection unit 410), and a result of determining whether OOD data occurs in the image (e.g., by the OOD data detection unit 430) may be stored (e.g., in the database 440) (S330).

An OOD ratio (e.g., with respect to data stored in the database 440) is monitored by the learning processor 460. For example, when it is determined (e.g., by the learning processor 460) that the OOD ratio (e.g. with respect to the data stored in the database 440) is less than a threshold value (Y), operation S310 may performed (e.g., by the anomaly detection unit 410). When it is determined (e.g., by the learning processor 460) that the OOD ratio (e.g., with respect to the data stored in the database 440) is greater than (and/or equal) to the threshold value (N), a user may be informed of this fact and/or data (e.g., in which OOD occurs and which is stored in the database 440) is transmitted to the active learning unit 450 (e.g., by the learning processor 460). In some embodiments, the active learning unit 450 extracts data to be target labeled from among the data in which OOD occurs and which is transmitted thereto (S350).

Figure 14:
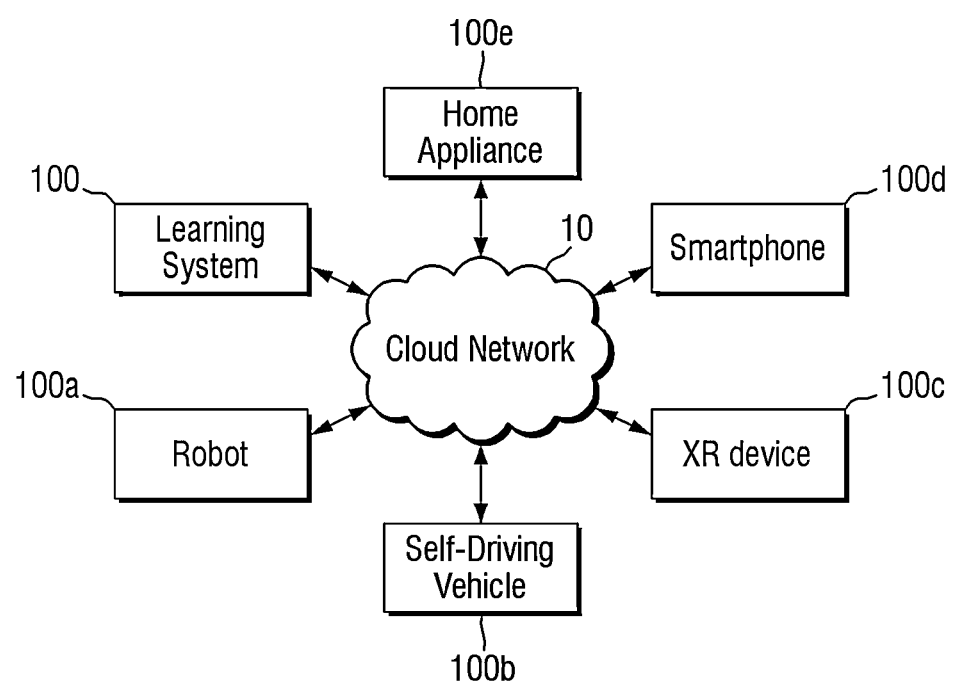
FIG. 14 is a block diagram for describing a deep learning system network environment 1 according to some embodiments.

FIG. 14 is a block diagram for describing a deep learning system network environment 1 according to some embodiments.

Referring to FIG. 14, the deep learning system network environment 1, according to some embodiments, may be connected to at least one of a robot 100*a*, a self-driving vehicle 100*b*, an XR device 100*c*, a smart phone 100*d*, and/or a home appliance 100*e* through a cloud network 10. Here, the robot 100*a*, the self-driving vehicle 100*b*, the XR device 100*c*, the smart phone 100*d*, and/or the home appliance 100*e* to which deep learning technology is applied may be referred to as external deep learning devices 100*a* to 100*e*.

The cloud network 10 may be part of a cloud computing infrastructure and/or may be a network included in the cloud computing infrastructure. In some embodiments, the cloud network 10 may be configured to use a 3G network, a 4G network, a Long-Term Evolution (LTE) network, a 5G network, and/or the like.

For example, the devices 100*a* to 100*e* and 100 (e.g., constituting the deep learning system network environment 1) may be connected to one another through the cloud network 10; and/or the devices 100*a* to 100*e* and 100 may communicate with one another via a base station and/or communicate with one another without the base station.

The deep learning system 100 may be connected to at least one of the robot 100*a*, the self-driving vehicle 100*b*, the XR device 100*c*, the smart phone 100*d*, and/or the home appliance 100*e* via the cloud network 10 to help a deep learning processing of the at least one deep learning device 100*a*, 100*b*, 100*c*, 100*d*, and/or 100*e* connected thereto.

For example, referring to FIGS. 1, 3, and 14, when it is detected and/or determined (e.g., by the learning processor 460 of the deep learning system 100) that an OOD ratio is equal to or greater than a threshold value, a notification informing of this fact may be transmitted to at least one of the robot 100*a*, the self-driving vehicle 100*b*, the XR device 100*c*, the smart phone 100*d* and/or the home appliance 100*e* through the communication unit 200.

The deep learning system 100 may receive input data from each of the deep learning devices 100*a* to 100*e*, infer a result value with respect to the received input data using a learning model, generate a response or a control command on the basis of the inferred result value, and transmit the response or the control command to each of the external deep learning devices 100*a* to 100*e*.

Alternatively, the external deep learning devices 100*a* to 100*e* may infer a result value with respect to the input data using the learning model and generate a response or a control command on the basis of the inferred result value.

Although embodiments of the present disclosure have been described above with reference to the accompanying drawings, it will be understood by those of ordinary skill in the art that the present disclosure is not limited thereto and may be implemented in many different forms without departing from the technical idea or essential features thereof. Therefore, it should be understood that the embodiments set forth herein are merely examples in all respects and not restrictive.

What is claimed is:

1. A deep learning device comprising:
processing circuitry configured to:
determine whether a received image is abnormal using an anomaly detection model,
merge at least some vectors extracted from the anomaly detection model,
perform a principal component analysis (PCA) on a result of the merging the at least some vectors,
input, to a probability approximation model, principal components generated by the PCA to detect whether out of distribution (OOD) occurs in data of the received image,
store, in a database, a result of the determination of whether the received image is abnormal and a result of determining whether the OOD occurs, and
extract at least some of the data in which the OOD occurs, as target labeling, using a target labeling extraction model when a rate of the data in which the OOD occurs is greater than or equal to a threshold value,
wherein the anomaly detection model determines whether the received image is abnormal using the target labeling.

2. The deep learning device of claim 1, wherein the anomaly detection model includes at least one of a convolutional neural network (CNN), an artificial neural network (ANN), a dense convolutional network (DenseNet), or a scaled CNN.

3. The deep learning device of claim 1, wherein the probability approximation model includes at least one of a Gaussian Mixture Model (GMM), a histogram-based model, a kernel density estimation model, a Parzen window estimation model, a k-nearest neighbor estimation model, or a k-means clustering model.

4. The deep learning device of claim 1, wherein the processing circuitry is further configured to check, in real time, whether the rate of the data in which the OOD occurs is greater than or equal to the threshold value.

5. The deep learning device of claim 1, wherein the processing circuitry is further configured to:
detect an optimal value for clustering between the principal components and the probability approximation model; and
detect whether the OOD occurs using at least some of the principal components which satisfy the optimal value and at least part of the probability approximation model which satisfy the optimal value.

6. The deep learning device of claim 5, wherein the optimal value is calculated according to at least one of a Bayesian information criterion (BIC), a Dunn index, a silhouette score, or an Akaike information criterion (AIC).

7. The deep learning device of claim 1, wherein the threshold value comprises a rate of the data in which the OOD occurs with respect to the image stored in the database when performance precision is a set value.

8. A deep learning system comprising:
an input unit configured to receive an image;
a processor configured to control the input unit; and
a deep learning device connected to the processor and configured to receive the image from the input unit, the deep learning device including processing circuitry and a database, the processing circuitry configured to
determine whether an image received from the input unit is abnormal using an anomaly detection model,
merge at least some vectors extracted from the anomaly detection model, perform a principal component analysis (PCA) on a result of the merging the at least some vectors, input, to a probability approximation model, principal components generated by the PCA to detect whether out of distribution (OOD) occurs in data of the image, store a result of the determination of whether the image is abnormal and a result of determining whether the OOD occurs, and extract at least some of the data in which the OOD occurs, as target labeling, using a target labeling extraction model when a rate of the data in which the OOD occurs is greater than or equal to a threshold value, and the database is configured to store the result of the determination of whether the image is abnormal and the result of determining whether the OOD occurs, wherein the anomaly detection model determines whether the image is abnormal using the target labeling.

9. The deep learning system of claim 8, wherein the anomaly detection model includes at least one of a convolutional neural network (CNN), an artificial neural network (ANN), a dense convolutional network (DenseNet), or scaled CNN.

10. The deep learning system of claim 8, wherein the probability approximation model includes at least one of a Gaussian Mixture Model (GMM), a histogram-based model, a kernel density estimation model, a Parzen window estimation model, a k-nearest neighbor estimation model or a k-means clustering model.

11. The deep learning system of claim 8, wherein the processing circuitry is further configured to check, in real time, whether the rate of the data in which the OOD occurs is greater than or equal to the threshold value.

12. The deep learning system of claim 8, wherein the processing circuitry is configured to:
detect an optimal value for clustering between the principal components and the probability approximation model; and
detect whether the OOD occurs using at least some of the principal components which satisfy an optical value and at least part of the probability approximation model which satisfy the optimal value.

13. The deep learning system of claim 12, wherein the optimal value is calculated according to at least one of a Bayesian information criterion (BIC), a Dunn index, a silhouette score, or an Akaike information criterion (AIC).

14. The deep learning system of claim 8, wherein the threshold value comprises a rate of the data in which the OOD occurs with respect to the image stored in the database when performance precision is a set value.

15. A deep learning system comprising:
an input unit configured to receive an image;
a processor configured to control the input unit; and
a deep learning device connected to the processor and configured to receive the image from the input unit, the deep learning device including processing circuitry configured to:
determine whether an image received from the input unit is abnormal using an anomaly detection model,
merge at least some vectors extracted from the anomaly detection model,
perform a principal component analysis (PCA) on a result of the merging the at least some vectors,
input, to a probability approximation model, principal components generated by the PCA to detect whether out of distribution (OOD) occurs in data of the image,
store, in a database, a result of the determining whether the image is abnormal and the result of detecting whether the OOD occurs, and
extract at least some pieces of data in which the OOD occurs using a target labeling extraction model when a rate of data in which the OOD occurs with respect to the image stored in the database is greater than or equal to a threshold value,
wherein the anomaly detection model determines whether the image is abnormal using the target labeling extraction model.

16. The deep learning system of claim 15, wherein the anomaly detection model includes at least one of a convolutional neural network (CNN), an artificial neural network (ANN), a dense convolutional network (DenseNet), or scaled CNN.

17. The deep learning system of claim 15, wherein the probability approximation model includes at least one of a Gaussian Mixture Model (GMM), a histogram-based model, a kernel density estimation model, a Parzen window estimation model, a k-nearest neighbor estimation model or a k-means clustering model.

18. The deep learning system of claim 15, wherein the processing circuitry is further configured to check, in real time, whether the rate of the data in which the OOD occurs is greater than or equal to the threshold value.

19. The deep learning system of claim 15, wherein the processing circuitry is configured to:
detect an optimal value for clustering between the principal components and the probability approximation model, and
detect whether the OOD occurs using at least some of the principal components which satisfy an optical value and at least part of the probability approximation model which satisfy the optimal value.

20. The deep learning system of claim 15, wherein the threshold value comprises a rate of the data in which the OOD occurs with respect to the image stored in the database when performance precision is a set value.

* * * * *